Patented Aug. 6, 1929.

1,723,167

UNITED STATES PATENT OFFICE.

RICHARD HERZ, OF FRANKFORT-ON-THE-MAIN, AND WERNER ZERWECK, OF FECHEN-HEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE.

HALOGENATED DINAPHTHYL-DICARBOXYLIC ACIDS.

No Drawing. Original application filed June 23, 1926, Serial No. 118,081, and in Germany July 2, 1925. Divided and this application filed May 17, 1928. Serial No. 278,617.

This application is a division of our application Serial No. 118,081, filed June 23, 1926.

We have found that dinaphthyl-dicarboxylic acids of the general formula:

$$(C_{10}X_6)_2(COOH)_2,$$

wherein the X's stand for hydrogen atoms, of which one or more may be replaced by a monovalent substituent, are obtained, if the diazo-compounds of aminonaphthoic acids of the general formula:

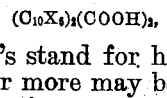

wherein the X's stand for hydrogen atoms, of which one or more may be replaced by a monovalent substituent, are treated with a suitable reducing agent, especially with an ammoniacal solution of cuprous oxide.

According to our new process the dinaphthylcarboxylic acids, their derivatives and nuclear substitution products can be easily manufactured in a pure state with an almost theoretical yield.

They are important intermediates for the production of vat dyestuffs.

The following examples will further illustrate our new process and the products obtained by it. We wish it however to be understood that we are not limited to the particular conditions nor to the specific products mentioned therein. The parts are by weight.

*Example.*—248 parts of bromonaphthostyril (see Eckstrand, Journ. für prakt. Chemie, vol. 38, page 173) are saponified to the 1-amino-4-bromonaphthalene-8-carboxylic acid, for instance by warming it with caustic soda solution of 10%. This solution is diazotized in the usual manner, and the diazo-compound is slowly introduced at an ordinary temperature into an ammoniacal solution of cuprous oxide, prepared as described in the parent application. The new 4.4'-dibromo-1.1'-dinaphthyl-8.8'-dicarboxylic acid of the probable formula:

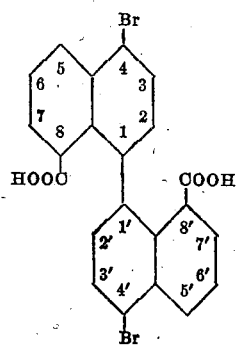

is obtained as a colorless powder, melting above 300° C., soluble in cold concentrated sulfuric acid with a red color, which turns to green when warmed.

We claim:

1. As new products halogenated dinaphthyl-dicarboxylic acids corresponding probably to the formula:

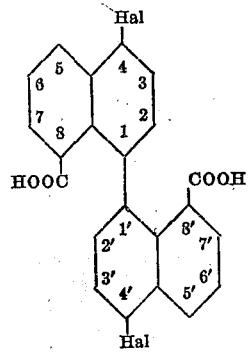

being when dry almost colorless powders, soluble in cold concentrated sulfuric acid with a red color.

2. As a new product a brominated dinaphthyl-dicarboxylic acid corresponding probably to the formula:

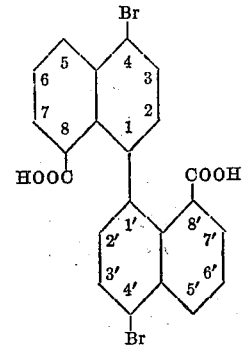

being when dry a colorless powder, melting above 300° C., soluble in cold concentrated sulfuric acid with a red color, which turns to green when warmed.

In testimony whereof we affix our signatures.

RICHARD HERZ.
WERNER ZERWECK.